United States Patent [19]
Kunz et al.

[11] Patent Number: 5,611,951
[45] Date of Patent: Mar. 18, 1997

[54] ARC WELDING TORCH

[76] Inventors: Erwin Kunz, Eugen Huberstr 160, 8048 Zurich, Switzerland; Jeffrey Bond, 6 Andermans, Windsor, Berks. SL4 5RN, England

[21] Appl. No.: 575,857

[22] Filed: Dec. 20, 1995

[51] Int. Cl.[6] .................................. B23K 9/173
[52] U.S. Cl. ............................. 219/137.62
[58] Field of Search ............... 219/137.62, 137.31, 219/137.63, 137.9, 136

[56]     References Cited

U.S. PATENT DOCUMENTS

| | | | |
|---|---|---|---|
| 2,881,305 | 4/1959 | Wojciak et al. | 219/137.9 |
| 3,047,714 | 7/1962 | Wepfer | 219/127 |
| 3,048,691 | 8/1962 | Longstreth | 219/137.62 |
| 3,189,723 | 6/1965 | Adamson | 219/137.62 |
| 3,265,856 | 8/1966 | Cecil | 219/137.31 |
| 3,428,778 | 2/1969 | Blackman | 219/137.31 |
| 3,529,126 | 9/1970 | Reeh . | |
| 3,541,298 | 11/1970 | Carkhuff . | |
| 3,576,423 | 4/1971 | Bernard et al. | 219/136 |
| 4,297,561 | 10/1971 | Townsend et al. | 219/137.63 |
| 4,464,560 | 8/1984 | Church et al. | 219/137.42 |
| 4,508,951 | 4/1985 | Rehrig, Jr. | 219/74 |
| 4,560,858 | 12/1985 | Manning | 219/137.52 |
| 4,667,083 | 5/1987 | Stol | 219/136 |
| 4,864,099 | 9/1989 | Cusick, III et al. | 219/137.62 |
| 5,248,868 | 9/1993 | Cusick, III | 219/137.62 |
| 5,349,158 | 9/1994 | Mari | 219/137.62 |

*Primary Examiner*—Clifford C. Shaw
*Attorney, Agent, or Firm*—Lyman R. Lyon, P.C.

[57]     ABSTRACT

A gas cooled arc welding torch has inner and outer metal heat transfer sleeves disposed in telescoped relation and defining a longitudinally extending gas channel therebetween and having a welding tip at one end thereof supported by the inner heat transfer sleeve in heat transfer relationship and enveloped in gas flowing through the gas channel.

3 Claims, 2 Drawing Sheets

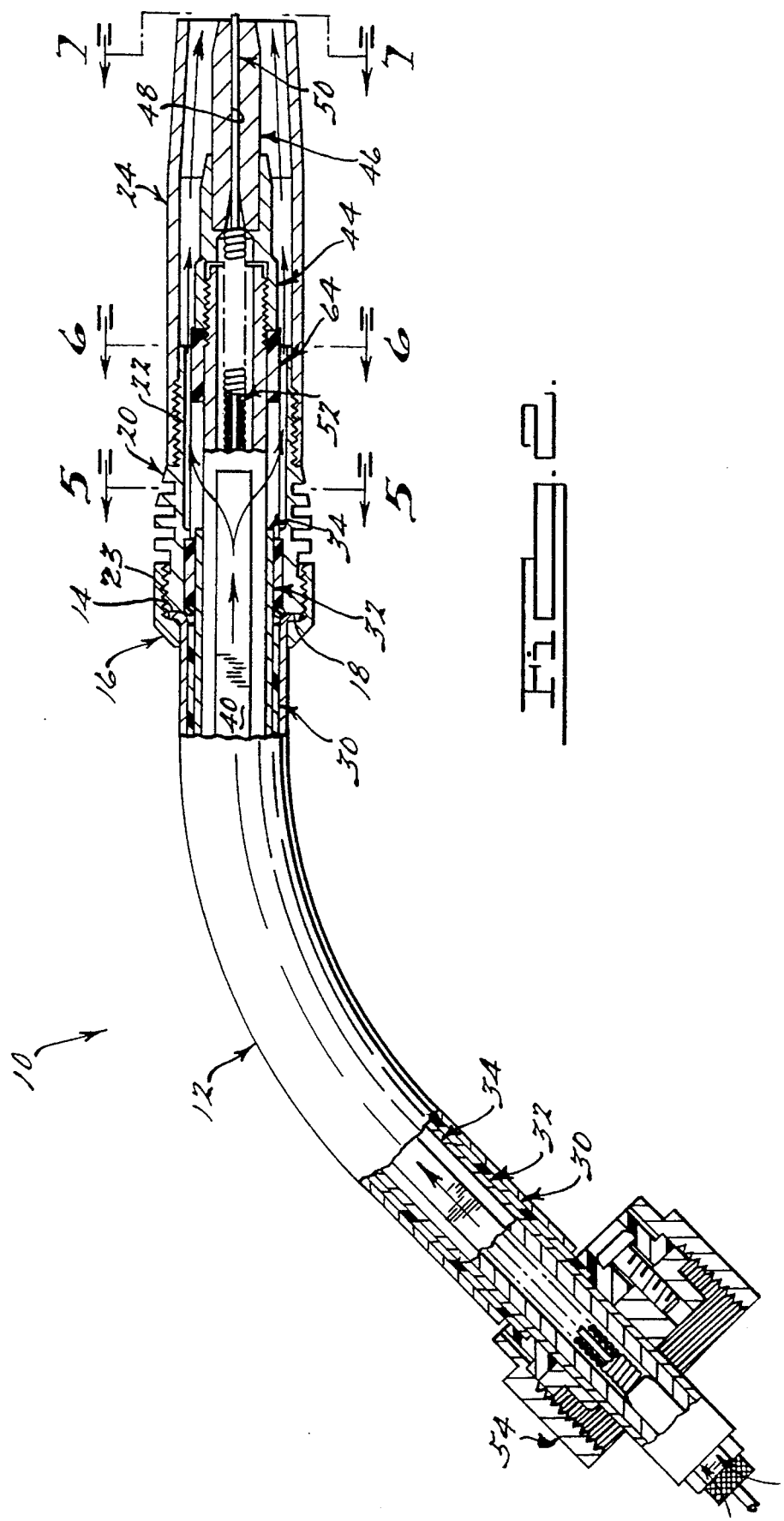

ARC WELDING TORCH

BACKGROUND OF THE INVENTION

This invention relates generally to arc welding, and more particularly to an improved cooling system for an arc welding torch.

Metal inert gas (MIG) arc welders feed welding filler wire from a spool through an arc welding torch to a welding zone on a workpiece. Electrical current maintains an arc between the end of the wire and the workpiece. The wire is continuously fed through a contact tip of the torch during welding and constitutes a consumable electrode which is fused into the weld puddle. The welding torch generally directs an inert gas to the welding zone which envelopes the arc. Since the contact tip of the welding torch functions as both a guide for the wire and as an electrical connector between a source of electrical energy and the wire as it slides therethrough, the contact tip is of necessity disposed relatively close to the electrical arc and therefore is subjected to the high temperature generated by the arc. In the absence of cooling, the contact tip would be subject to warping, fusion to the welding wire, oxidation, and fouling due to scale build-up.

SUMMARY OF THE INVENTION

The present invention maximizes cooling of the contact tip of a welding torch thereby to minimize warping, fusion of the welding wire to the tip, oxidation and fouling.

More specifically, the tip of the welding torch is mounted on a relatively long heat conductive mandrel which is exposed along its entire length to a flow of cooling gas. The mandrel is positively supported for its entire length enabling it to withstand relatively high temperatures without compromise of structural integrity due to heat.

BRIEF DESCRIPTION OF THE DRAWINGS

FIG. 2 is a view, similar to FIG. 1, partially in cross section.

DETAILED DESCRIPTION OF THE PREFERRED EMBODIMENT

Figure 1:
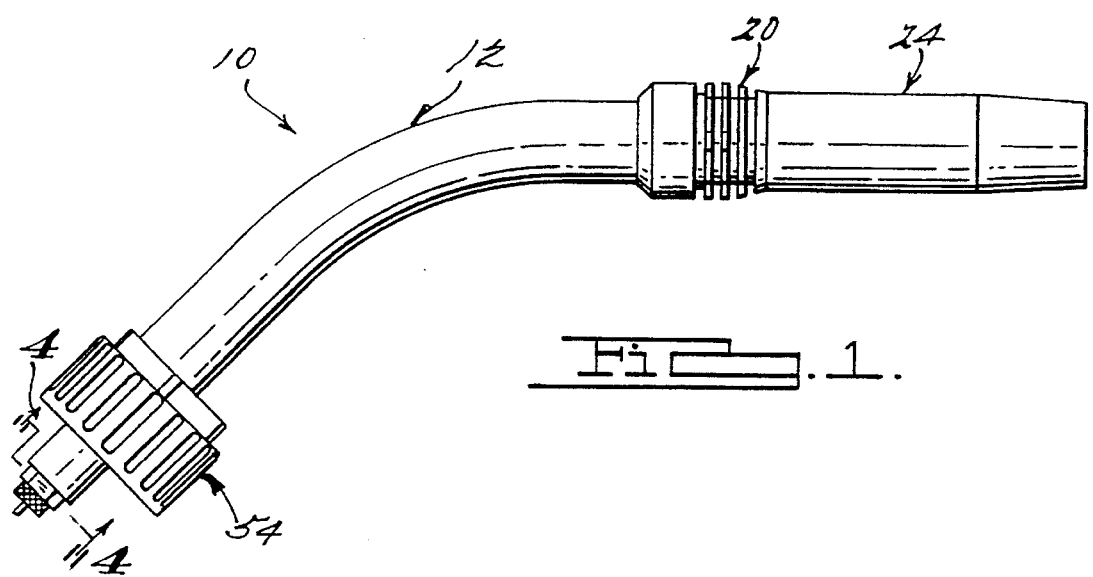
FIG. 1 is an elevational view of the welding torch of the present invention.
Figure 3:
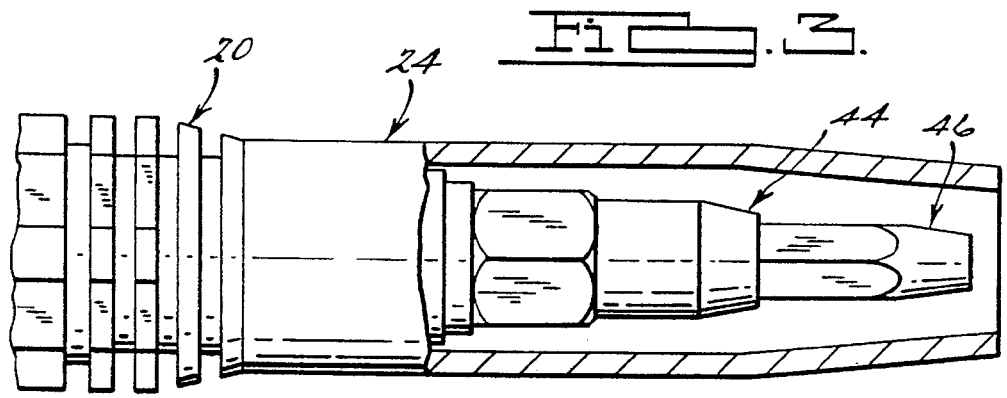
FIG. 3 is an enlarged view, partially in section, of the contact tip of the torch of FIG. 1.
Figure 4:
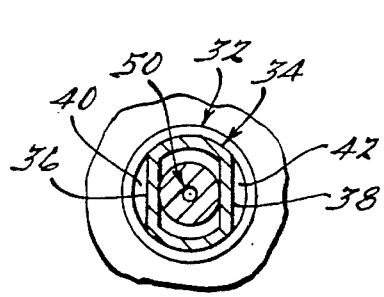
FIG. 4 is a cross-sectional view taken along the line 4—4 of FIG. 1.

As seen in FIGS. 1 and 2, an arc welding torch 10, in accordance with a preferred constructed embodiment of the present invention, comprises a cylindrical outer tube 12 made from, for example, stainless steel. The tube 12 has a flange 14 at an outer end thereof that is engageable by a shroud retention nut 16. The flange 14 of the tube 12 is trapped between the nut 16 and an end face 18 on an intermediate gas shroud 20. The intermediate gas shroud 20 has an externally threaded end portions 22 and 23 for the acceptance of a tubular outer gas shroud 24 and the nut 16, respectively.

An insulating sleeve 30 is telescoped internally of the tube 12 and extends to a point adjacent the flange 14 thereon. A metal outer heat transfer sleeve 32 is telescoped internally of the insulating sleeve 30 and about a metal inner sleeve 34. The sleeves 32 and 34 are of relatively efficient heat conductive metal, for example copper.

In accordance with one feature of the invention, the inner sleeve 34 has a pair of diametrically spaced flats 36 and 38 thereon, that define a pair of longitudinally extending passages 40 and 42 for the passage of gas longitudinally of the welding torch 10, as shown by arrows in FIG. 2. The inner sleeve 34 extends forwardly into radial alignment with the outer shroud 24 for the support of a nut 44. The nut 44 supports a welding tip 46 having a central bore 48 for the acceptance, guidance and electrical connection of a consumable wire 50. The wire 50 is guided by a helically-wound wire guide 52 which extends substantially the entire length of the inner sleeve 34.

A nut 54 at the opposite end of the tube 12 from the nozzle sleeve 24 is engageable with complementary conduits and connectors for inert gas and electrical current, respectively, in the conventional manner.

Figure 5:
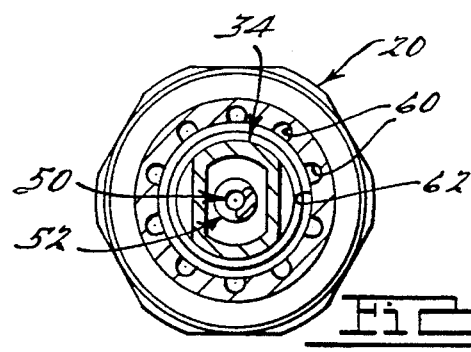
FIG. 5 is a cross-sectional view taken along the line 5—5 of FIG. 2.
Figures 6, 7:
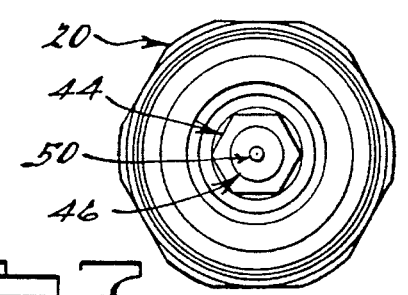
FIG. 6 is a cross-sectional view taken along the line 6—6 of FIG. 2.
FIG. 7 is a cross-sectional view taken along the line 7—7 of FIG. 2.

In accordance with another feature of this invention, and as best seen in FIGS. 5 and 6, the intermediate shroud 20 is provided with a plurality of longitudinally extending circumferentially spaced grooves 60 on a radially inner surface 62 thereof for the passage of gas from the passages 40 and 42 defined by the sleeves 32 and 34 past an insulating sleeve 64, thence over the nut 44 and tip 46. Since the inner tube 34 extends into heat transfer relationship with the nut 44 and tip 46, the entire length thereof is exposed to the flow of cooling gas.

While the preferred embodiment of the invention has been disclosed, it should be appreciated that the invention is susceptible of modification without departing from the scope of the following claims.

I claim:

1. A gas cooled arc welding torch comprising;

an elongated metal tube;

an electrical insulating sleeve disposed radially inwardly of said tube in close telescoped relation;

an outer metal heat transfer sleeve disposed radially inwardly of said insulating sleeve in close telescoped relation;

an inner metal heat transfer sleeve disposed radially inwardly of said outer heat transfer sleeve, said outer and inner transfer sleeves having longitudinally extending portions spaced from one another so as to define a longitudinally extending gas channel therebetween;

an intermediate gas shroud at one end of said outer tube communicating with the gas channel defined by said heat transfer sleeves;

an outer gas shroud supported by said intermediate gas shroud;

a welding tip disposed radially inwardly of said outer gas shroud and supported by said inner heat transfer sleeve in heat transfer relationship, said welding tip having a central passage for the guidance of a consumable welding wire; and means at the opposite end of said outer tube for connecting the gas passage defined by said heat transfer and gas conductor tubes to a source of cooling gas.

2. The welding torch of claim 1, wherein said inner heat transfer sleeve has a pair of diametrically spaced flats on an outer surface thereof defining said gas channel.

3. The welding torch of claim 1 wherein said intermediate gas shroud has a plurality of axially extending circumferentially spaced gas passages for conducting gas from said gas channel to said welding tip.

* * * * *